(12) United States Patent
Benecke

(10) Patent No.: US 9,379,646 B2
(45) Date of Patent: Jun. 28, 2016

(54) METHOD AND ASSEMBLY FOR OPERATING SYNCHRONOUS MOTORS

(71) Applicant: Siemens Aktiengesellschaft, Munich (DE)

(72) Inventor: Marcel Benecke, Magdeburg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 30 days.

(21) Appl. No.: 14/354,962

(22) PCT Filed: Oct. 29, 2012

(86) PCT No.: PCT/EP2012/071345
§ 371 (c)(1),
(2) Date: Apr. 29, 2014

(87) PCT Pub. No.: WO2013/068257
PCT Pub. Date: May 16, 2013

(65) Prior Publication Data
US 2014/0312826 A1     Oct. 23, 2014

(30) Foreign Application Priority Data
Nov. 7, 2011   (DE) .......................... 10 2011 085 859

(51) Int. Cl.
*H02P 1/42* (2006.01)
*H02P 6/06* (2006.01)
(Continued)

(52) U.S. Cl.
CPC . *H02P 1/46* (2013.01); *H02P 27/18* (2013.01)

(58) Field of Classification Search
CPC ..... H02P 21/06; H02P 21/0089; H02P 27/04; H02P 21/0035; H02P 27/08; H02P 21/14; H02P 21/0021; H02P 21/02; H02P 21/10; H02P 23/0095; H02P 23/14; H02P 25/023; H02P 6/08; H02P 6/16; H02P 1/46

USPC ............ 318/254, 400.34, 432, 721, 723, 802, 318/806, 807, 400.03
See application file for complete search history.

(56) References Cited

U.S. PATENT DOCUMENTS 4,364,004 A * 12/1982 Bourbeau ...................... 318/721
4,443,747 A *  4/1984 Chausse et al. ............... 318/723
(Continued)

FOREIGN PATENT DOCUMENTS

CN       1658486 A      8/2005
DE   102004046966 A1    4/2006
(Continued)

OTHER PUBLICATIONS

Office Action for Chinese Patent Application No. 2012800539266 issued on Jan. 5, 2016 with English translation thereof.

*Primary Examiner* — Paul Ip
(74) *Attorney, Agent, or Firm* — Harness, Dickey & Pierce, P.L.C.

(57) ABSTRACT

A method is disclosed for operating a synchronous machine via a three-phase power controller including three semiconductor controllers and connected to a three-phase network. The method includes determining the phase difference between the magnet-wheel voltage of the synchronous machine and the network voltage of the three-phase network; determining the rotational speed of the rotor of the synchronous machine; determining the phase position of the three-phase network; determining at least some of the stator currents of the synchronous machine; determining a decision characteristic number based upon an advance calculation of the torque curve in the event of activation of at least two of the semiconductor controllers while taking into account the current values for phase difference, rotational speed, stator current, and phase position; and determining at least one switching time point based upon the decision characteristic number, wherein the at least two semiconductor controllers are activated at the switching time point.

14 Claims, 3 Drawing Sheets

(51) Int. Cl.
   *H02P 1/46* (2006.01)
   *H02P 27/18* (2006.01)

(56) References Cited

U.S. PATENT DOCUMENTS

| | | | | |
|---|---|---|---|---|
| 4,565,957 | A * | 1/1986 | Gary et al. | 318/723 |
| 4,857,819 | A * | 8/1989 | Maurice | H02P 1/30 318/778 |
| 5,187,419 | A * | 2/1993 | DeLange | 318/805 |
| 5,272,429 | A * | 12/1993 | Lipo et al. | 318/808 |
| 6,236,179 | B1 * | 5/2001 | Lawler | B60L 11/1807 318/375 |
| 6,362,586 | B1 * | 3/2002 | Naidu | 318/432 |
| 7,053,587 | B2 | 5/2006 | Ito et al. | |
| 7,245,449 | B2 * | 7/2007 | Stein et al. | 360/65 |
| 7,294,988 | B2 * | 11/2007 | Ajima et al. | 318/712 |
| 7,531,976 | B2 * | 5/2009 | Fukamizu et al. | 318/400.34 |
| 7,696,715 | B2 * | 4/2010 | Fisher et al. | 318/802 |
| 8,169,181 | B2 * | 5/2012 | Ranganathan | H02K 17/28 318/727 |
| 8,410,733 | B2 * | 4/2013 | Ranganathan | H02P 4/00 318/400.01 |
| 8,421,398 | B2 * | 4/2013 | Fisher et al. | 318/806 |
| 8,704,480 | B2 | 4/2014 | Benecke et al. | |
| 2002/0070715 | A1 * | 6/2002 | Sasaki et al. | 322/28 |
| 2003/0184170 | A1 | 10/2003 | Kurnia | |
| 2005/0194925 | A1 | 9/2005 | Ito et al. | |
| 2006/0087265 | A1 * | 4/2006 | Furem | 318/105 |
| 2006/0087278 | A1 * | 4/2006 | Furem | 318/778 |
| 2006/0125439 | A1 * | 6/2006 | Ajima et al. | 318/716 |
| 2006/0267527 | A1 * | 11/2006 | Khopkar | H02P 6/00 318/400.01 |
| 2007/0046247 | A1 * | 3/2007 | Barie et al. | 318/799 |
| 2007/0194730 | A1 * | 8/2007 | Fukamizu et al. | 318/254 |
| 2007/0273323 | A1 * | 11/2007 | Acquaviva | H02P 1/46 318/720 |
| 2008/0001571 | A1 * | 1/2008 | Tomigashi | 318/721 |
| 2008/0074076 | A1 * | 3/2008 | Fisher | H02P 27/04 318/802 |
| 2010/0148719 | A1 * | 6/2010 | Fisher | H02P 27/04 318/806 |
| 2010/0253254 | A1 * | 10/2010 | Ranganathan | H02P 4/00 318/400.09 |
| 2011/0050157 | A1 * | 3/2011 | Ranganathan | H02K 17/28 318/818 |
| 2011/0219208 | A1 * | 9/2011 | Asaad et al. | 712/12 |
| 2011/0225442 | A1 | 9/2011 | Benecke et al. | |
| 2011/0266992 | A1 * | 11/2011 | Nishiguchi et al. | 318/807 |
| 2012/0313566 | A1 | 12/2012 | Benecke | |

FOREIGN PATENT DOCUMENTS

| | | |
|---|---|---|
| DE | 102008057701 A1 | 5/2010 |
| DE | 102010008814 A1 | 8/2011 |

* cited by examiner

METHOD AND ASSEMBLY FOR OPERATING SYNCHRONOUS MOTORS

PRIORITY STATEMENT

This application is the national phase under 35 U.S.C. §371 of PCT International Application No. PCT/EP2012/071345 which has an International filing date of Oct. 29, 2012, which designated the United States of America and which claims priority to German application No. DE 102011085859.8 filed Nov. 7, 2011, the entire contents of each of which are hereby incorporated herein by reference.

FIELD

At least one embodiment of the invention generally relates to a method for operating synchronous motors and/or an associated assembly for operating synchronous motors by way of a three-phase power controller which is connected to a three-phase network and comprises semiconductor controllers, for example thyristors connected in antiparallel. An embodiment deals in particular with the start-up of the synchronous motor.

BACKGROUND

Three-phase synchronous motors not having a starting cage are tied to the frequency of the three-phase supply network on account of their principle of operation. A start-up, in other words powering up such motors is therefore not possible directly on the network. Rather, a device which enables powering up in the first place is necessary between the three-phase network and the synchronous machine. To this end, a frequency converter is normally used. The frequency converter consists of a rectifier, an intermediate circuit capacitor and an inverter. It is used in order to generate a three-phase current having a selectable frequency.

SUMMARY

At least one embodiment of the invention is directed to a method and/or an assembly by which the operation of a synchronous machine on a three-phase network is enabled with minimal requirements in terms of power electronics components. In this situation, the start-up of the synchronous machine should in particular be enabled.

A method is disclsoed. An assembly is disclosed. Developments of the invention are set down in the dependent claims.

With regard to the method according to at least one embodiment of the invention for operating a synchronous machine by way of a three-phase power controller comprising three semiconductor controllers which is connected to a three-phase network, the following steps are executed:
- determination of the phase difference between magnet-wheel voltage of the synchronous machine and network voltage of the three-phase network,
- determination of the rotational speed of the rotor of the synchronous machine,
- determination of the phase position of the three-phase network,
- determination of at least some of the stator currents of the synchronous machine,
- advance calculation of the torque curve for the synchronous machine for a definable period of time in the event of activation of at least two of the semiconductor controllers while taking into account the determined values for phase difference, rotational speed, stator current and phase position, and
- determination of a switching time point on the basis of the advance calculation, in which case the at least two semiconductor controllers are activated at the switching time point.

The assembly according to at least one embodiment of the invention, for operating a synchronous machine, is designed in order to execute the described method. It comprises a three-phase power controller which can be connected to a three-phase network and comprises three semiconductor controllers for the phases of the three-phase network. The assembly furthermore comprises:
- a device for determining the phase difference between magnet-wheel voltage of the synchronous machine and network voltage of the three-phase network,
- a device for determining the rotational speed of the rotor of the synchronous machine,
- a device for determining the phase position of the three-phase network,
- a device for determining at least some of the stator currents, and
- a control facility designed in order to calculate in advance from the values determined a torque curve for the synchronous machine for a definable period of time on activation of at least some of the semiconductor controllers and on the basis of the advance calculation to ascertain a switching time point at which the semiconductor controllers are activated.

The described method is implemented in particular, in at least one embodiment, by software. With reference to the described device, this has in particular a control unit which is designed in order to implement the described procedure. It can therefore be implemented simply in existing power controllers without any additional requirement in terms of components. Acquisition of the rotor speed is necessary in this case. It is advantageous if a control unit, which is expediently implemented today as a microprocessor provided in the synchronous machine, assumes control of the power controller. In this case, data from for example a position encoder integrated in the synchronous machine is already automatically available. Furthermore, such a synchronous machine can already include the power controller, in other words be implemented as a complete unit which can thus be connected directly to a three-phase network.

BRIEF DESCRIPTION OF THE DRAWINGS

A preferred but not in any way restrictive example embodiment of the invention will now be described in detail with reference to the drawing. In this situation the features are illustrated schematically and corresponding features are identified by the same reference characters. The figures show this in detail.

DETAILED DESCRIPTION OF THE EXAMPLE EMBODIMENTS

Figure 1:
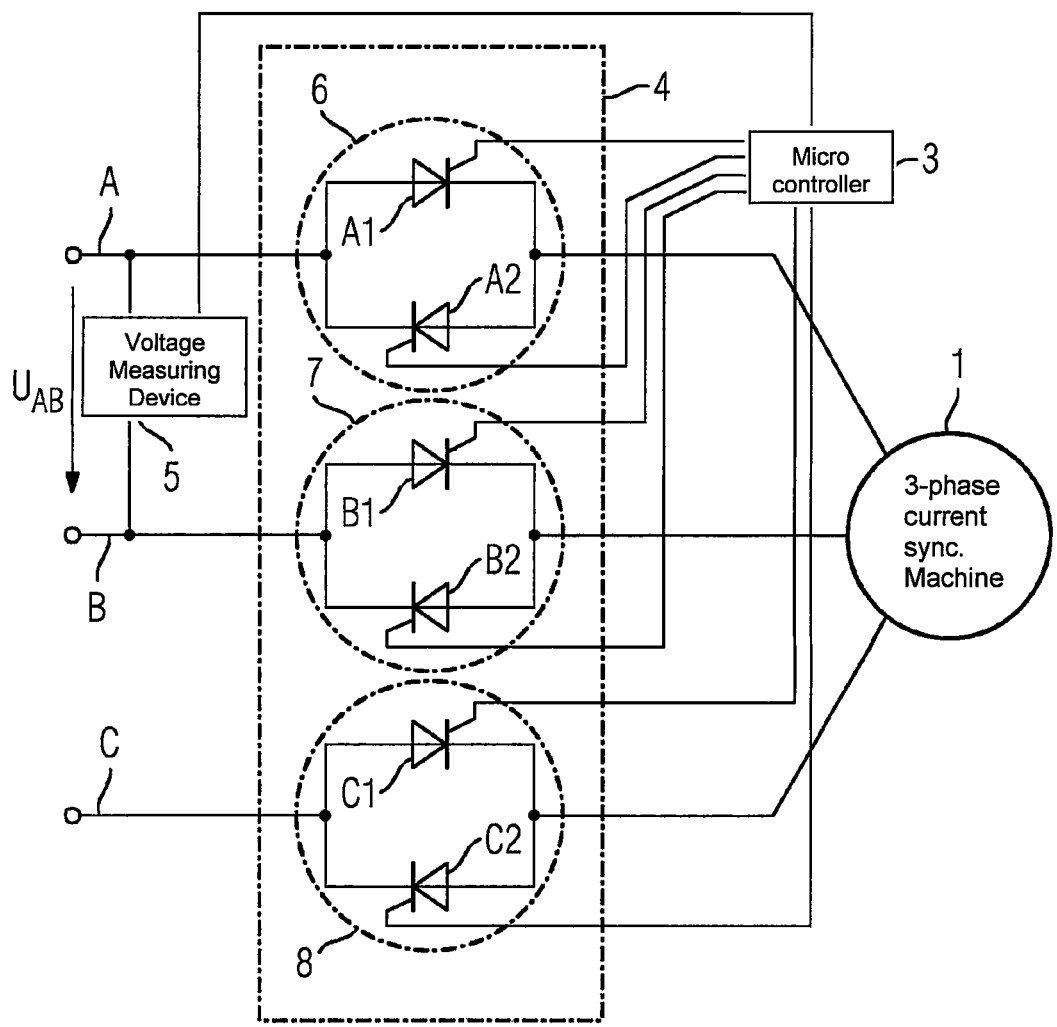
FIG. 1 shows an equivalent circuit diagram of a power controller with a synchronous machine connected.

With regard to the method according to at least one embodiment of the invention for operating a synchronous machine by way of a three-phase power controller comprising three semiconductor controllers which is connected to a three-phase network, the following steps are executed:

A determination is carried out of a first parameter in the form of a phase difference between magnet-wheel voltage of the synchronous machine and network voltage of the three-phase network. This can be effected for example through measurement of the three-phase network voltage and magnet-wheel voltage and corresponding comparison. Furthermore, a determination is carried out of the rotational speed of the rotor of the synchronous machine as a second parameter. The phase position of the three-phase network is determined as a third parameter. In other words, this involves ascertaining how far the current point in time is removed from the most recent zero crossing of one of the phase voltages. At least some of the stator currents, preferably all three stator currents, are determined as a fourth parameter. The stated parameters can be replaced by other, physically equivalent parameters in this situation.

On the basis of the four parameters, an advance calculation of the torque curve is performed for the synchronous machine for a definable period of time in the event of activation of at least two of the semiconductor controllers while taking into account the determined values for phase difference, rotational speed, stator current and phase position. On the basis of the advance calculation a switching time point is determined at which the at least two semiconductor controllers are activated. To this end, the decision characteristic number is advantageously compared with a definable threshold value in order to ascertain a switching time point. When thyristors are employed in the power controller, this period of time preferably results from the automatic extinguishing of all thyristors at the respective zero crossing of the current.

This means that the situation is advantageously achieved that a switching on of the semiconductor controllers is performed only at such switching point times at which an overall positive torque curve is expected, in other words an overall accelerating torque. Braking torque is avoided. In this situation however the use of a frequency converter is not necessary but merely the power controller is employed.

In this situation, according to an advantageous embodiment of the invention, the advance calculation is used as the basis for ascertaining whether the present point in time is employed as a switching time point. In other words, on the basis of the ascertained parameters a decision is always taken for the current point in time, in other words now, as to whether the semiconductor controllers are activated. The method is then expediently executed regularly at as short intervals in time as possible, for example at intervals of 1 ms.

In an embodiment of the invention, a maximum current occurring which results on activation of the power controllers is taken into consideration. Alternatively or additionally, it is possible to take into consideration a mean torque over the activation time.

In an advantageous development of the invention, torque curves for the activation of all semiconductor controllers and also for the activation of the three pairs each comprising two semiconductor controllers are calculated in advance. It is also possible to take into consideration only some of said four different options. The advance calculation is performed for all said torque curves. The results are then compared with one another and for example with a threshold value and a decision is taken as to whether a switching time point is present or not and in this case a decision is taken as to which semiconductor controllers are activated.

The options for activation of the semiconductor controllers are considerably expanded in this manner because the operation of only two of the semiconductor controllers simultaneously is also taken into consideration. At the same time, it is then also possible when two of the semiconductor controllers have already been activated and current is flowing to constantly check whether the additional connection of the third semiconductor controller would improve the torque curve to be expected.

The assembly according to at least one embodiment of the invention, for operating a synchronous machine, is designed in order to execute the described method. It comprises a three-phase power controller which can be connected to a three-phase network and comprises three semiconductor controllers for the phases of the three-phase network. The assembly furthermore comprises:

a device for determining the phase difference between magnet-wheel voltage of the synchronous machine and network voltage of the three-phase network, a device for determining the rotational speed of the rotor of the synchronous machine, a device for determining the phase position of the three-phase network, a device for determining at least some of the stator currents, and a control facility designed in order to calculate in advance from the values determined a torque curve for the synchronous machine for a definable period of time on activation of at least some of the semiconductor controllers and on the basis of the advance calculation to ascertain a switching time point at which the semiconductor controllers are activated.

The power controller comprises at least three semiconductor controllers having semiconductor switching elements. The semiconductor switching elements in question can for example be AC power controllers. The AC power controllers can for example be implemented as pairs of thyristors connected in antiparallel or as triacs. IGBTs or other types of semiconductor switches could however also be used. The power controller is connected to a three-phase network. The stator winding of the synchronous motor is in this situation preferably connected in star fashion without a neutral conductor. The AC power controllers are activated or triggered, in other words switched to conducting or prepared for conduction, at certain points in time.

The device in question for determining the rotational speed of the rotor of the synchronous machine can for example be a device for determining the mechanical position angle of the rotor. The mechanical position angle expediently specifies the position of the rotor in relation to a definable spatially fixed position. The position angle extends in this case expediently from 0° to 360°. The rotational speed is concluded from the change over time in the position angle.

The phase position of the three-phase network in at least one of the phases of the stator winding is furthermore ascertained. It is also possible to use different measuring methods in this case. For the described method and the device it is necessary to ascertain the elapsed time since the most recent zero crossing of the voltage of a phase. Said elapsed time can be represented, ascertained and used as an angle or as time or in a different manner.

The described method is implemented in particular, in at least one embodiment, by software. With reference to the described device, this has in particular a control unit which is designed in order to implement the described procedure. It can therefore be implemented simply in existing power controllers without any additional requirement in terms of components. Acquisition of the rotor speed is necessary in this case. It is advantageous if a control unit, which is expediently implemented today as a microprocessor provided in the synchronous machine, assumes control of the power controller. In this case, data from for example a position encoder integrated in the synchronous machine is already automatically available. Furthermore, such a synchronous machine can already include the power controller, in other words be implemented as a complete unit which can thus be connected directly to a three-phase network.

In FIG. 1, a three-phase current synchronous machine 1 is connected by way of a three-phase power controller 4 to the phases A, B, C of a three-phase network. Each of the phases A, B, C is assigned a semiconductor controller 6, 7, 8 consisting of two thyristors A1, A2, B1, B2, C1, C2 connected in antiparallel. The trigger electrodes of the thyristors A1, A2, B1, B2, C1, C2 are connected to a control device 3 by means of which the trigger signals required in order to trigger the thyristors A1, A2, B1, B2, C1, C2 are made available. The control device 3 is implemented by means of a microcontroller. A voltage measuring device 5 is connected between two phases A, B, C of the network, for example between the terminals A and B of the network in FIG. 1, at the output of which voltage measuring device 5 the network voltage UAB occurring between said two terminals A and B is available. Further voltage measuring devices, not shown, can likewise be present for the other two phase pairs.

In an embodiment variant the control device 3 and the power controller 4 are a unit separate from the three-phase current synchronous machine 1, in other words implemented as a separate motor control device. In a second embodiment variant the control device 3 and the power controller 4 are part of the three-phase current synchronous machine 1. In this case, the functions of the control device 3 are expediently integrated into a microprocessor already present in the three-phase current synchronous machine 1. In the present example embodiment the control device 3 is used for processing a suitable program by which the operation of the device can take place via software.

In order to accelerate the synchronous machine from a standstill an accelerating torque is required. To this end it is necessary to supply the stator winding with current in such a manner that positive torque (internal torque) is produced which both effects an acceleration of the machine and also compensates for the counter torque of the load. According to the equation 1 the internal torque is also dependent on the rotor position in addition to the currents.

$$m_i = \frac{3}{2} p \cdot \psi_P \cdot \left( i_{1A} \cdot (-\sin\vartheta_R) + (i_{1B} - i_{1C}) \cdot \cos\vartheta_R \cdot \frac{1}{\sqrt{3}} \right)$$

where $m_i$ is the internal torque, p the pole pair number, $i_n$ stator currents 21, 22, 23, and $v_R$ the rotor position.

Figure 2:
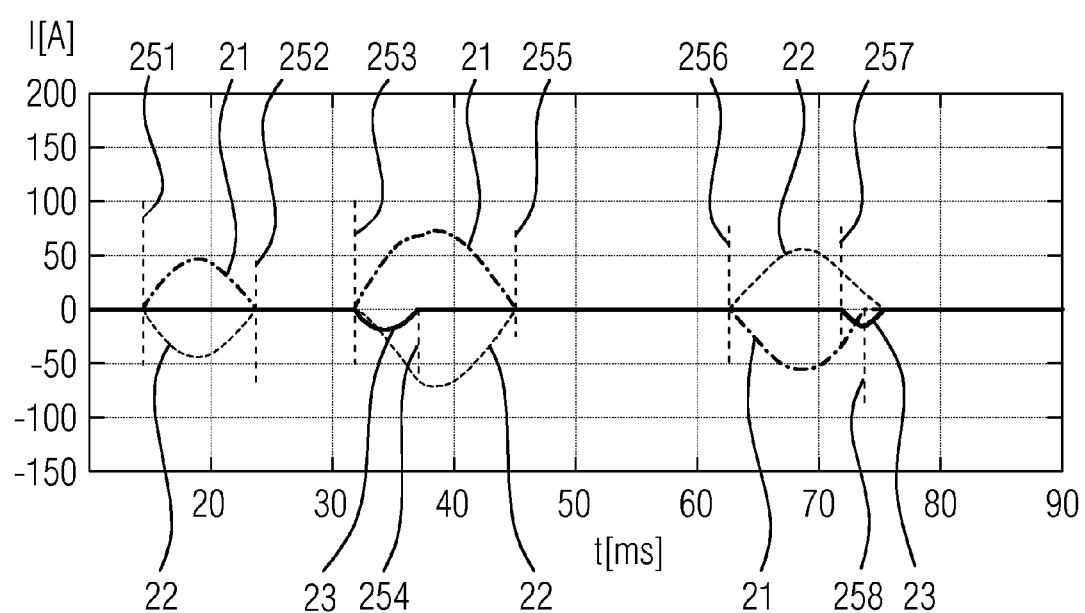
FIG. 2 shows a graph for stator currents after switching on semiconductor controllers.
Figure 3:
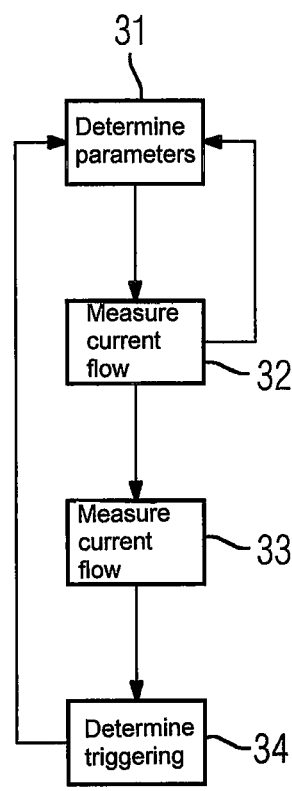
FIG. 3 shows a flowchart for a method for operating the synchronous machine.

In order to generate at a certain point in time through ignition of the thyristors stator currents 21, 22, 23 which deliver a favorable torque curve, the stator currents 21, 22, 23 and the torque are calculated for certain parameter constellations. The parameters used are the rotational speed, the phase position of the network voltage and of the voltage induced by the rotor, and also the existing stator currents 21, 22, 23. In this situation a process sequence as illustrated in FIG. 3 is executed. FIG. 2 shows associated examples of curves of the stator currents 21, 22, 23, wherein first to eighth points in time 251 . . . 258 are marked.

In a first step 31, the above-mentioned parameters rotational speed, the phase position of the network voltage and the voltage induced by the rotor, and also the existing stator currents 21, 22, 23 are measured.

A second step 32 determines whether the thyristors A1, A2, B1, B2, C1, C2 in the semiconductor controllers 6, 7, 8 have all been triggered by observing the measured current flow. If all the stator currents are still non-zero, the sequence returns to step 31. In the current curves which are illustrated in FIG. 2 this is the case for example between the third point in time 253 and the fourth point in time 254. A further triggering cannot take place here and it is not possible to switch off the thyristors A1, A2, B1, B2, C1, C2 on account of their principle of operation. The control unit cannot therefore intervene here. In the period of time between the seventh and eighth points in time 257, 258 the sequence likewise returns to the first step 31.

Otherwise, provided that all the semiconductor controllers 6, 7, 8 have been activated, the resulting torque curve is calculated from the measured parameters. Since thyristors A1, A2, B1, B2, C1, C2 are used in the semiconductor controllers 6, 7, 8 of this example, due to the automatic extinguishing of the thyristors A1, A2, B1, B2, C1, C2 a finite calculation period of time results for the calculation until all currents and the torque are zero. If the current point in time is for example in the range not all that long after the third point in time 253, then a calculation period of time up to the fifth point in time 255 automatically results.

By considering the average torque, a decision characteristic number is ascertained from the torque curve for the entire calculation period of time. Specifically in the present example this checks whether the average torque resulting is greater than zero, in other words whether on average an acceleration is to be expected. In addition, for this purpose a check is made as to whether a negative threshold value for the torque is not undershot in the torque curve.

A third step 33 determines whether thyristors A1, A2, B1, B2, C1, C2 are still triggered by again considering the measured current flow. If no thyristor is triggered at the present time, then the resulting torque curve is calculated from the parameters, but now provided that only two of the three semiconductor controllers 6, 7, 8 are activated in each case. This results in three different torque curves, for which in each case a decision characteristic number is ascertained in similar fashion to the second step 32. An example of such a triggering of the thyristors A1, A2, B1, B2, C1, C2 is given in range between the first and second points in time 251, 252 and also between the sixth and seventh points in time 256, 257.

In a fourth step 34, a comparison of the decision characteristic numbers with one another and with a threshold value is carried out and a decision thus taken as to whether a triggering is performed and if so, which combination of semiconductor controllers 6, 7, 8 is activated. If a combination of semiconductor controllers 6, 7, 8, the triggering of which results in a usable torque curve, is ascertained as having been activated then the corresponding control of the thyristors A1, A2, B1, B2, C1, C2 is performed. Thereupon the sequence returns to the first step 31.

In the present example the calculation is performed at time intervals of approx. 1 ms. As a result of the constant recalculation also taking place during the process of current flow which results after a triggering of two of the three semiconductor controllers 6, 7, 8 a subsequent activation of the third of the semiconductor controllers 6, 7, 8 can also take place if this provides the expectation of an improved torque curve compared with remaining at two activated semiconductor controllers 6, 7, 8. This is the case for example at the seventh point in time 257. At this point in time the control device 3 ascertains that an additional activation of the remaining semiconductor controller 6, 7, 8 is advantageous for the acceleration of the synchronous machine 1. The additional activation is then performed and a three-phase current flow results for the remaining time up to the eighth point in time 258.

When the nominal rotational speed of the synchronous machine 1 has been reached, then a transfer to network-synchronized operation is expedient. To this end, in the present example an additional reference value mref is calculated which is taken into consideration with regard to control of the semiconductor controllers 6 . . . 8. In this situation the value $m_{ref}$ is the sum of part values $m_{speed}$ and $m_{pre} \cdot m s_{peed}$ in turn is calculated from the relative difference $\Delta n$ of the current rotational speed $n_{ist}$ from the nominal rotational speed $n_{synch}$ and also machine constants. In addition, $m_{speed}$ is subjected to filtering in respect of maximum and minimum values.

$$m_{speed} = K_m \cdot \frac{\Delta n}{n_{synch}}$$

$m_{pre}$ is calculated as follows:

$$m_{pre} = \left(1 - \frac{\Delta n}{n_{synch}}\right) \cdot \sin(\Delta \vartheta)$$

$m_{pre}$ is still also calculated using machine constants and again contains the relative difference $\Delta n$ of the current rotational speed $n_{ist}$ from the nominal rotational speed $n_{synch}$. The sum $m_{ref}$ is evaluated in the control device 3 as the upper limit for the torque to be generated. If the value $m_{ref}$ is for example less than zero, no positive torque whatsoever should be generated. Since the control device 3 does not in any case generate negative torques, no triggering whatsoever of the thyristors A1, A2, B1, B2, C1, C2 takes place in the event of a negative $m_{ref}$. This means that in the case of rotational speeds above the nominal rotational speed a further acceleration is prevented.

The invention claimed is:

1. A method for operating a synchronous machine via a three-phase power controller including three semiconductor controllers connected to a three-phase power supply, the method comprising:
    providing a microcontroller having a processor, wherein the processor
    determines a phase difference between magnet-wheel voltage of the synchronous machine and voltage of the three-phase power supply;
    determines a rotational speed of the rotor of the synchronous machine based on a position angle of the rotor;
    determines a phase position of the three-phase power supply;
    determines at least some of stator currents of the synchronous machine;
    calculates a torque curve for the synchronous machine for a definable period of time in the event of activation of each of the semiconductor controllers having thyristors connected in anti-parallel while taking into account the determined values for phase difference between at least two phases controlled by the semiconductor controllers, the rotational speed, the stator current and the phase position of the three-phase power supply, and calculates another torque curve for the synchronous machine for a definable period of time in the event of activation of less than all of the semiconductor controllers while taking into account the determined values for phase difference between at least two phases controlled by the at least two semiconductor controllers, the rotational speed, the stator current and the phase position of the three-phase power supply;
    determines a switching time point based upon the calculation, wherein the at least two semiconductor controllers are activated at the switching time point; and
    triggers the at least two semiconductor controllers based on the determined switching time point.

2. The method of claim 1, wherein the processor ascertains whether a present point in time is employed as a switching time point based on the calculation.

3. The method of claim 2, wherein the processor determines a decision characteristic number from the calculation and comparing the decision characteristic number with a threshold value to ascertain the switching time point.

4. The method of claim 2, wherein included in the calculation and taken into consideration is a maximum current occurring in the period of time which results on activation of the least two semiconductor controllers for the ascertained phase difference, phase position, stator current and rotational speed.

5. The method of claim 2, wherein the processor performs an advance calculation of the torque curves both for the activation of all semiconductor controllers and for the activation of respective three pairs of thyristors in each of the semiconductor controllers, each comprising two semiconductor controllers.

6. The method of claim 2, wherein the processor determines a maximum torque value based upon the phase difference and the rotational speed and the maximum torque value is taken into consideration such that no activation of the semiconductor controllers is carried out if the advance calculation results in an expected torque above the maximum torque value.

7. The method of claim 1, wherein the processor determines a decision characteristic number from the calculation and comparing the decision characteristic number with a threshold value to ascertain the switching time point.

8. The method of claim 7, wherein included in the calculation and taken into consideration is a maximum current occurring in the period of time which results on activation of the least two semiconductor controllers for the ascertained phase difference, phase position, stator current and rotational speed.

9. The method of claim 7, wherein the processor performs an advance calculation of the torque curves both for the activation of all semiconductor controllers and for the activation of respective pairs of thysistors in each of the semiconductor controllers, each comprising two semiconductor controllers.

10. The method of claim 7, wherein the processor determines a maximum torque value based upon the phase difference and the rotational speed and the maximum torque value is taken into consideration such that no activation of the semiconductor controllers is carried out if the advance calculation results in an expected torque above the maximum torque value.

11. The method of claim 1, wherein included in the calculation and taken into consideration is a maximum current occurring in the period of time which results on activation of the least two semiconductor controllers for the ascertained phase difference, phase position, stator current and rotational speed.

12. The method of claim 1, wherein the processor performs an advance calculation of the torque curves both for the activation of all semiconductor controllers and for the activation of respective pairs of thyristors in each of the semiconductor controllers, each comprising two semiconductor controllers.

13. The method of claim 1, wherein the processor determines a maximum torque value based upon the phase difference and the rotational speed, and the maximum torque value is taken into consideration such that no activation of the semiconductor controllers is carried out if the advance calculation results in an expected torque above the maximum torque value.

14. An assembly for operating a synchronous machine, comprising:
- a three-phase power controller, connectable to a three-phase power supply and including three semiconductor controllers for respective phases of the three-phase power supply, each of the semiconductor controllers having two thyristors connected in anti-parallel;
- a microcontroller configured to
  - determine a phase difference between magnet-wheel voltage of the synchronous machine and voltage of the three-phase power supply;
  - determine rotational speed of the rotor of the synchronous machine;
  - determine phase position of the three-phase power supply; and
  - determine at least some of the stator currents wherein the microcontroller is further configured
  - to calculate, from the determined phase difference, rotational speed, stator current and phase position, a torque curve for the synchronous machine for a definable period of time on activation of each of the semiconductor controllers and, based upon the calculation, to ascertain a switching time point at which the semiconductor controllers are activated and to calculate another torque curve for the synchronous machine for a definable period of time in the event of activation of less than all of the semiconductor controllers while taking into account the determined values for phase difference between at least two phases controlled by the at least two semiconductor controllers, the rotational speed, the stator current and the phase position of the three-phase power supply.

* * * * *